United States Patent [19]

Abe

[11] 3,962,545
[45] June 8, 1976

[54] UTILITY METER READING SYSTEM USING TELEPHONE LINE

[75] Inventor: Takeshi Abe, Tokyo, Japan

[73] Assignee: Ricoh Co., Ltd., Tokyo, Japan

[22] Filed: July 25, 1974

[21] Appl. No.: 491,882

[30] Foreign Application Priority Data
Oct. 20, 1973  Japan............................ 48-118342
Dec. 30, 1973  Japan................................ 49-1017

[52] U.S. Cl............................ 179/2 AM; 340/152 R
[51] Int. Cl.² ........................................ H04M 11/00
[58] Field of Search ............... 179/2 R, 2 A, 2 AM; 340/151, 152 R

[56] References Cited
UNITED STATES PATENTS

| | | | |
|---|---|---|---|
| 3,113,176 | 12/1963 | Doktor et al. ............................. | 179/3 |
| 3,754,215 | 8/1973 | Blomenkamp ....................... | 340/151 |
| 3,842,206 | 10/1974 | Barsellotti et al. ..................... | 179/2A |
| R26,331 | 1/1968 | Brothman et al. .................... | 179/2 A |

Primary Examiner—Kathleen H. Claffy
Assistant Examiner—George G. Stellar
Attorney, Agent, or Firm—Frank J. Jordan

[57] ABSTRACT

A plurality of remote terminals are each connected to different pluralities of gas or electric meters or the like which are close together such as in an apartment building complex. The remote terminals communicate with a central terminal over a single public telephone line. The central terminal transmits an interrogation signal to the remote terminals over the telephone line, which then transmit the meter readings over the telephone line to the central terminal for recording.

12 Claims, 4 Drawing Figures

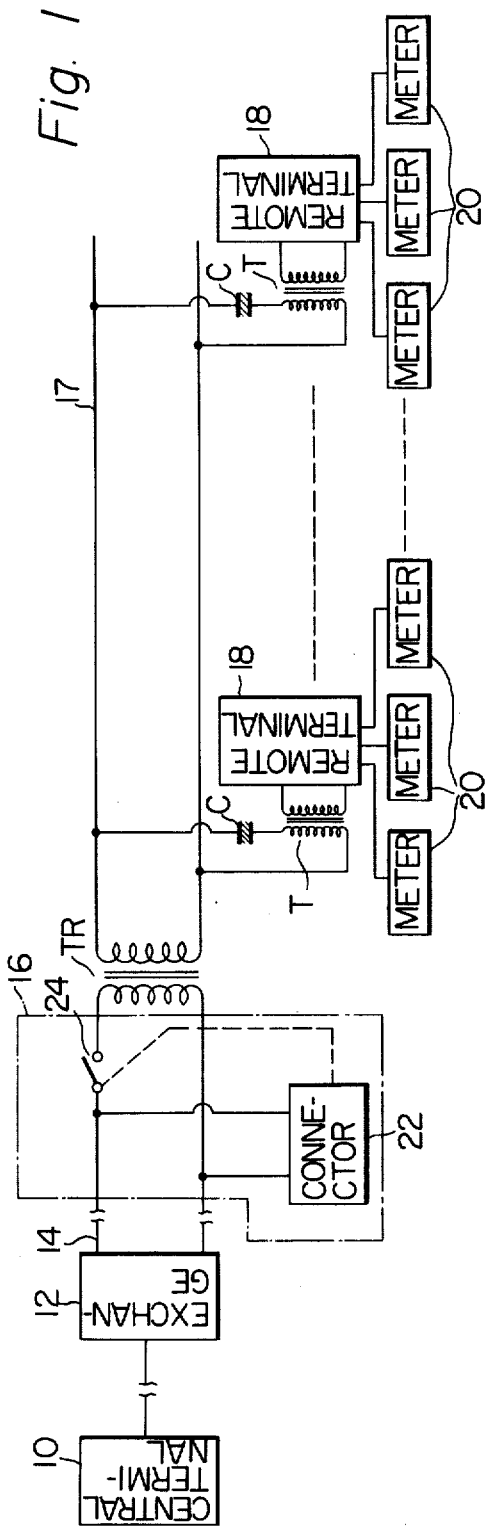
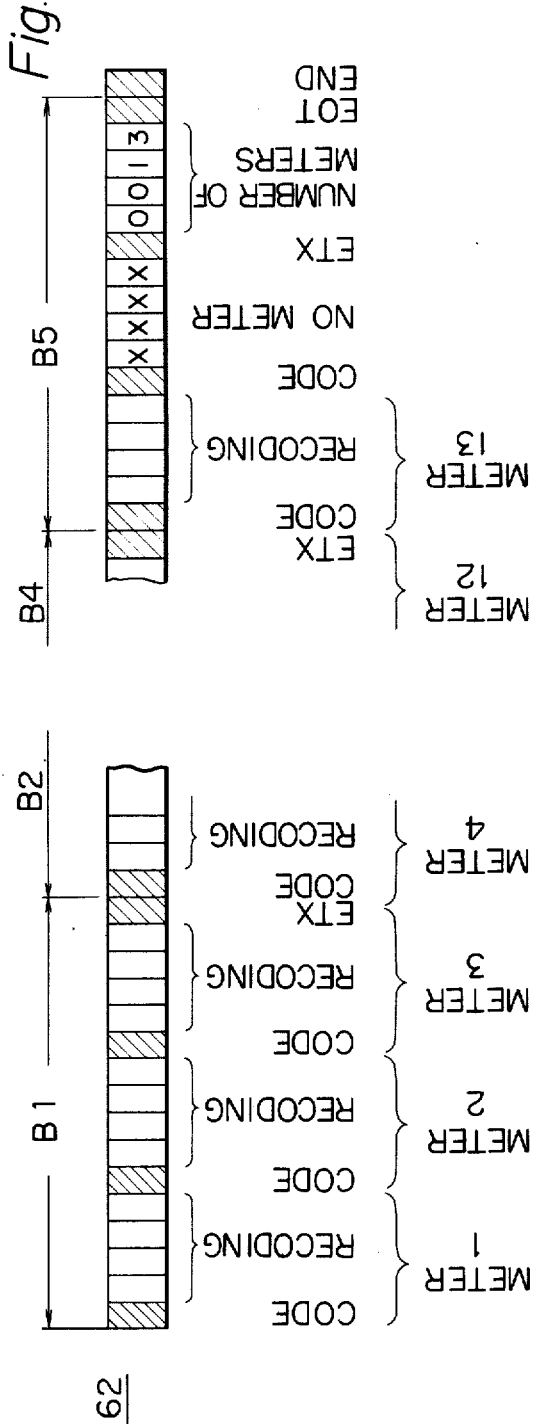

UTILITY METER READING SYSTEM USING TELEPHONE LINE

The present invention relates to a system for reading utility meters such as gas or electric meters or the like from a remote location using a single public telephone line.

The present invention is specifically directed at use in apartment buildings, apartment building complexes and housing developments in which many individual housing units utilizing public utilities such as water, gas and electricity are grouped close together. Meters are generally provided to measure the amount of gas or the like which is used by each housing unit in order to compute the utility charge for the unit. Normally, the meters are read periodically by utility company employees who go door to door to read each meter individually. Especially in areas where the housing density, and thereby the number of utility meters is great, the manpower required to read the meters is quite substantial, and results in high labor costs. Also, the employees frequently misread the meters, causing inconvenience to both the utility users and the utility company.

It is therefore an important object of the present invention to provide a utility meter reading system by which a great number of utility meters may be read from a remote location in a short period of time.

It is another important object of the present invention to provide a meter reading system by which the time and expense required to read a large number of meters are very low.

It is yet another important object of the present invention to provide a meter reading system by which a large number of meters may be read with a high degree of accuracy using a single public telephone line.

The above and other objects, features and advantages of the present invention will become more clear from the following detailed description taken with the accompanying drawings, in which:

FIG. 1 is a schematic diagram of a meter reading system embodying the present invention;

FIG. 4 is a graphic representation of a data format used in the system shown in FIG. 1.

Figure 2:
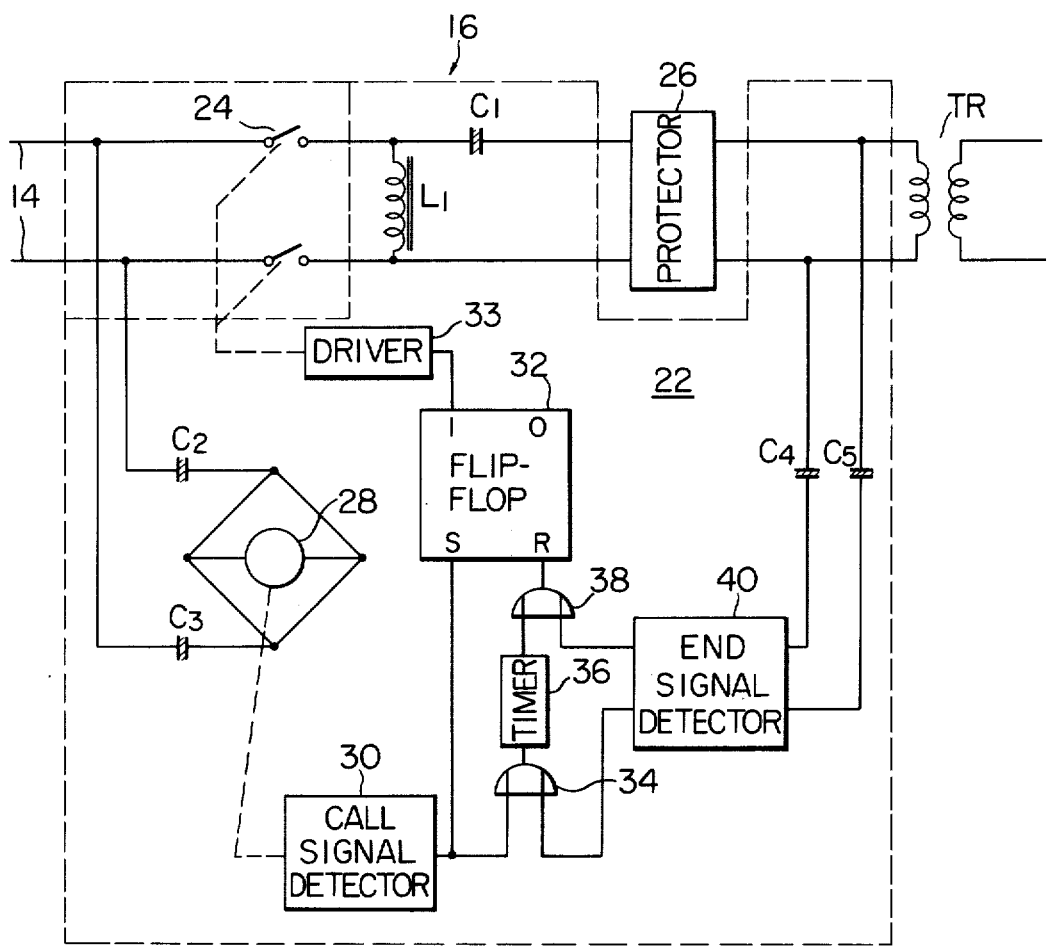
FIG. 2 is a schematic diagram of a connection unit shown in FIG. 1.

Referring now to FIG. 1, a system according to the present invention comprises a central terminal 10 connected through a public telephone exchange 12 and a public telephone DC loop or line 14 to a connection unit 16 constituting part of remote terminal means (no numeral). The output of the connectioin unit 16 is fed through a coupling transformer TR, a bus line 17, and transformers T and capacitors C to remote terminals 18 respectively. Any number of remote terminals 18 may be provided, the number shown being two, and each remote terminal 18 is connected to different pluralities of utility meters 20 respectively. The meters 20 may be adapted to measure the consumption of any utility such as gas, water and electricity, and one meter 20 is provided for each housing unit (not shown). The connection unit 16 comprises a connector 22 and a line switch 24, as will be described in detail below.

Referring now to FIG. 2, a capacitor $C_1$, coil $L_1$ and protector 26 are connected to the line 14 in series and parallel respectively, and the switch 24 is arranged to open and close the DC loop or line 14. A bridge rectifier 28 has inputs connected through capacitors $C_2$ and $C_3$ to the line 14, and has an output connected to a call signal detector 20. The output of the detector 30 is connected to a set input S of a bistable device or flip-flop 32, and also to the input of an OR gate 34. The output of the OR gate 34 is connected to the input of a timer 36, the output of which is connected to an input of an OR gate 38. The output of the OR gate 38 is connected to a reset input R of the flip-flop 32. The output of the flip-flop 32 is applied to the switch 24 through a driver 33. An END signal detector 40 has inputs connected to the line 14 between the protector 26 and the transformer TR through capacitors $C_4$ and $C_5$. Outputs of the detector 40 are connected to inputs of the OR gates 34 and 38.

Figure 3:
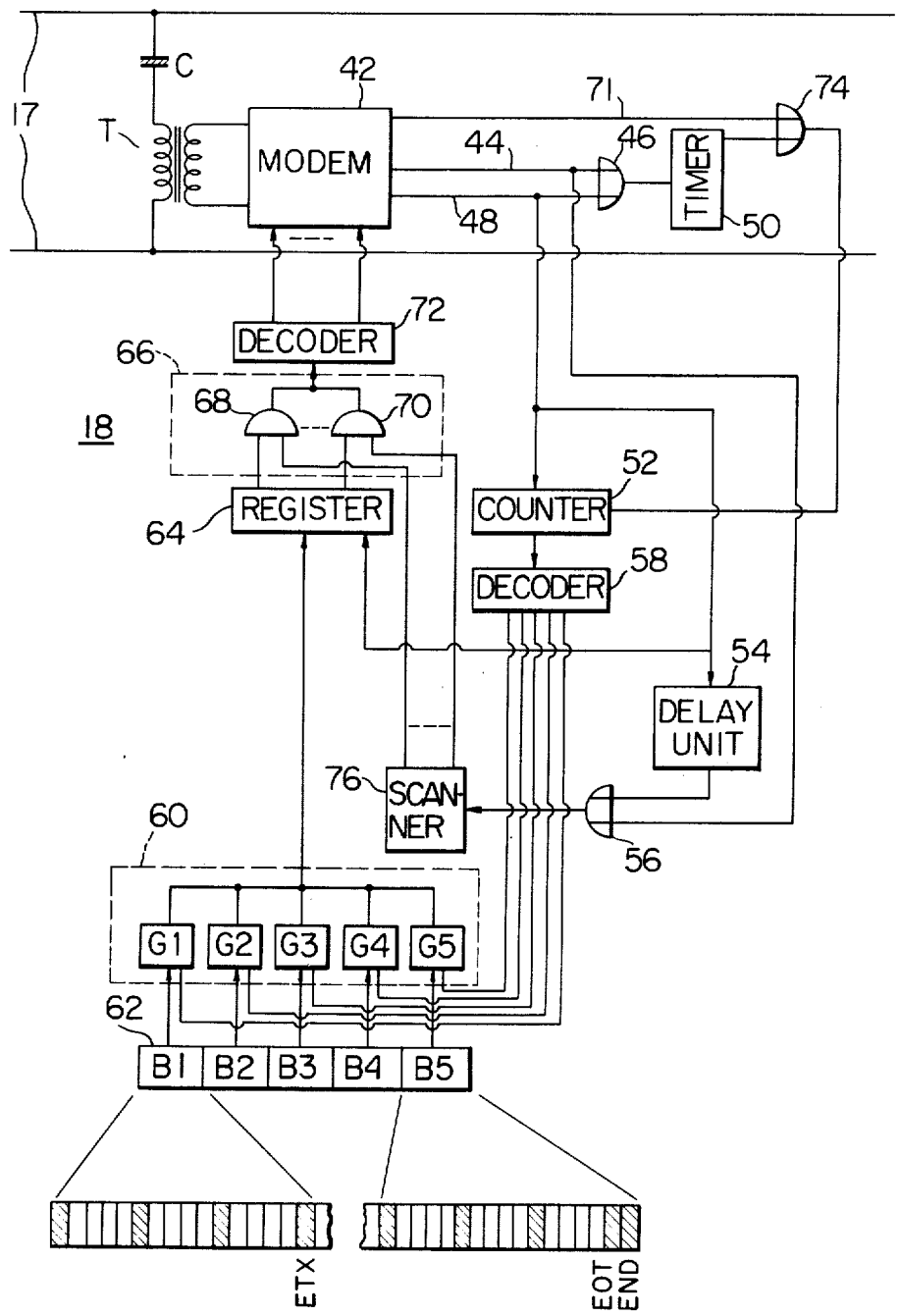
FIG. 3 is a schematic diagram of a terminal unit shown in FIG. 1.

Referring now to FIG. 3, one remote terminal 18 is shown and comprises a modem 42 connected to the bus line 17 through the transformer T. A first output of the modem 42 is connected through a line 44 to an input of an OR gate 46, and another output of the modem 42 is connected through another line 48 to another input of the OR gate 46. The output of the OR gate 46 is connected to the input of a timer 50. The line 48 is also connected to the inputs of a counter 52 and a delay unit 54 respectively. The line 44 and the output of the delay unit 54 are connected to inputs of an OR gate 56 respectively. The output of the counter 52 is connected to an input of a decoder 58, the outputs of which are connected to AND gates (not shown) of gates G1 to G5 of a first gate unit 60. A storage unit or buffer register 62 is provided, which is connected to a plurality of the meters 20 (not shown in FIG. 3) so that the instantaneous values of the readings of the meters 20 are stored in the register 62 as will be described in detail below. Blocks B1 to B5 of the register 62 are connected to the gates G1 to G5 respectively. The output of the gate unit 60 is connected to a transmission or buffer register 64, the outputs of which are connected to inputs of a second gate unit 66. The unit 66 comprises a plurality of AND gates, two of which are shown and designated as 68 and 70. The output of the gate unit 66 is connected through a decoder 72 to the modem 42. The line 48 is also connected to a reset input of the register 64. Another output of the modem 42 is connected through a line 71 to an input of an OR gate 74, the output of the timer 50 being connected to another input thereof. The output of the OR gate 74 is connected to a reset input of the counter 52. The output of the OR gate 56 is connected to the input of a scanner 76, the output of which is connected to inputs of the AND gates 68 and 70 of the gate unit 66.

Referring now to FIG. 4, the register 62 is connected to the meters 20 so that three meters 20 may be connected to each block B1 to B5. Within each block B1 to B5, each meter 20 is represented by a meter code, which may be the serial or service number of the individual meter 20, and a four bit or digit meter reading. In addition, an ETX or end-of-block indication is provided following the representation of the last meter 20 in each block. The meters 20 are connected directly to the register 62 so that the instantaneous values of the meter readings are constantly stored and updated in the register 62. In Block B5, it will be noticed there is no meter 14, and a blank space or "no-meter" indication is provided. Following the space in block B5 for meter 14, the number of meters connected to the remote terminal 18 is stored, and an EOT or end-of-transmission indication follows the number of meters indication. If the remote terminal 18 is the last in the series, an END indication is provided following the number of meters or EOT indication. It will be appreciated that the number of meters indication may be provided anywhere in the register 62, such as in block B1 before the representation of meter 1. The remote terminal 18 shown in FIG. 3 may be connected to the meters 20 on one floor of an apartment building (not shown), and all of the remote terminals 18 in the particular series may be arranged to serve the entire apartment building.

In operation, when it is desired to read the meters 20, a utility company employee or computer dials the telephone number corresponding to the line 14. The exchange 12 then applies a 16 Hz call signal, constituting part of an interrogation signal, to the connection unit 16. This call signal will be rectified by the rectifier 28 (refer to FIG. 2) and applied to the call signal detector 30 which applies a logical 1 signal to the set input S of the flip-flop 32. The output of the flip-flop 32 is applied through the driver 33 to the line switch 24 (which corresponds to a hook switch of a standard telephone) to close the same and establish a DC loop or connection between the remote terminal 18 and the central terminal 10. After the exchange 12 has confirmed that the connection has been made, the central terminal 10 transmits an answer or read signal ACK to the remote terminal 18 (see FIG. 3). The read signal ACK for each terminal 18 has a different frequency, and a given terminal 18 is only actuated by a read signal ACK of its own frequency. The read signal ACK is demodulated by the modem 42 and applied through the line 48 to the input of the counter 52 to increment the same. Since the counter 52 was normally reset to zero, the first read signal ACK will increment the contents of the counter 52 to a value of one. The decoder 58, in response to the count of one in the counter 52 will enable the AND gates of the gate G1 of the gate unit 60 so that the contents of block B1 of the register 62 will be applied through the gate unit 60 to the register 64. The read signal ACK is also applied to the register 64 to reset the same and through the delay unit 54 and the OR gate 56 to the scanner 76, which is actuated after a predetermined time delay to scan the contents of the register 64 by sequentially enabling the AND gates represented by 68 and 70 and apply the contents on a bit-by-bit basis to the decoder 72. The output of the decoder 72 is applied to the modem 42 for transmission to the central terminal 10 which is operative to demodulate the transmitted signals and record the meter readings which they represent. After the block B1 is transmitted, the central terminal 10 will receive the end-of-block signal ETX and transmit another read signal ACK. If the transmission of a block B1 to B5 is not satisfactorily received by the central terminal 10, the same will transmit a re-transmit signal NACK to the remote terminal 18 which will be applied through the modem 42, line 44 and OR gate 56 to the scanner 76 to re-scan the contents of the register 64 without reset or time delay. Since in the example shown the register 62 comprises five blocks B1 to B5, a total of five read signals ACK will be applied to the terminal 18 to read the blocks B1 to B5 by means of the gates G1 to G5 respectively. After transmission of all of the blocks B1 to B5 is completed, the end-of-transmission signal EOT is received by the central terminal 10, which will then transmit to the next terminal 18 a read signal ACK having the frequency designated to activate the next terminal 18.

This signal ACK will be fed from the modem 42 of the previously read terminal 18 through the line 71 and the OR gate 74 to the reset input of the counter 52 to reset the contents of the counter 52 to zero. As shown, both the ACK and NACK signals are applied through the OR gate 46 to the timer 50. THe output of the timer 50 is also applied to an input of the OR gate 74, and at a predetermined time after receipt of a signal ACK or NACK, the timer 50 will transmit a pulse to the counter 52 to reset the same to zero. In this manner, the last terminal 18 of the series can automatically reset itself to the normal or zero condition, and other termnals can automatically reset themselves to the normal condition in the case of a transmission malfunction or the like to prevent erroneous operation or overcounting of the counter 52.

The last terminal 18 of the series contains the END indication in its block B5, which will be imposed on the bus line 17 by the modem 42. Referring back to FIG. 2, this END signal will be detected by the END signal detector 40 and applied to the reset input R of the flip-flop 32 to reset the same. The output of the flip-flop 32 will then drop to zero, and the switch 24 will open to break the telephone connection between the central terminal 10 and the remote terminals 18 of the series being read. Also, the END signal will be recognized at the central terminal 10 so that the same will move on to read another series of remote terminals 18. The outputs of both the call and END signal detectors 30 and 40 respectively are connected to the input of the timer 36 through the OR gate 34. The timer 36 is similar to the timer 50 of the terminal 18, and applies a pulse to the reset input R of the flip-flop 32 to reset the same in case of a transmission or other malfunction after a predetermined length of time.

It will be appreciated by those skilled in the art that expansion and modification of a meter reading system embodying the present invention is facilitated since the number of meters 20 connected to each remote terminal 18 is stored in the register 62 of each remote terminal 18. Also, new terminals 18 can be easily added since they are activated in dependance on the frequency of the read signal ACK, which can vary over a wide range.

What is claimed is:

1. A system for reading utility meters, comprising:
   remote terminal means connected to the meters and operative to store the meter readings therein;
   central terminal means communicating with the remote terminal means by a telephone line;
   the central terminal means being operative to transmit an interrogation signal to the remote terminal means;
   the remote terminal means being further operative to transmit the meter readings to the central terminal means in response to the interrogation signal;
   the remote terminal means comprising a plurality of remote terminals, each remote terminal being connected to a different plurality of meters, the frequency of the interrogation signal being different for each remote terminal; and
   each remote terminal being in a normal status prior to receipt of the interrogation signal and being operative to reset itself to the normal status at a predetermined time after receipt of the interrogation signal at it own frequency and in response to the interrogation signal at a frequency for another remote terminal.

2. A system according to claim 1, in which the remote terminal means is further operative to transmit to the central terminal means meter identification signals corresponding to each meter respectively and a meter number signal designating the numbers of meters connected to the remote terminal means.

3. A system according to claim 1, in which each remote terminal is operative to store the meter readings therein in the form of at least one block, each block containing the readings of a plurality of meters, and to transmit each block to the central terminal means so that the readings of the meters are transmitted in sequence.

4. A system according to claim 3, in which the remote terminal is further operative to transmit to the central terminal means an end-of block signal after transmission of each block and an end-of transmission signal after all of the at least one blocks have been transmitted.

5. A system according to claim 1, in which the remote terminal means is further operative to complete a telephone connection between itself and the central terminal means in response to the interrogation signal, and to break the telephone connection after transmission of the meter readings.

6. A system according to claim 5, in which the remote terminal means includes a connection unit and terminal unit, and in which:
    the connection unit is operative to complete the telephone connection between the central terminal means and the remote terminal means in response to the interrogation signal;
    the remote terminals being operative to subsequently transmit the meter readings followed by an end signal; and
    the connection unit is further operative to break the telephone connection in response to the end signal.

7. A system according to claim 6, in which the interrogation signal comprises a call signal followed by a read signal, the connection unit being operative to complete the telephone connection in response to the call signal and the remote terminals being operative to transmit the meter readings in response to the read signal.

8. A system according to claim 7, in which the terminal unit comprises:
    a storage unit connected to the meters and operative to store the meter readings therein;
    a modem connected to the telephone line; and
    gate means operatively arranged to sequentially gate the meter readings from the storage unit to the modem in response to the read signal.

9. A system according to claim 8, in which the meter readings are arranged in a plurality of blocks in the storage unit, the central terminal means being operative to transmit a read signal for each block, and in which the gate means comprises:
    a counter connected to the modem arranged to increase its count in response to each read signal;
    a decoder having an input connected to the output of the counter;
    a first gate unit connected to the storage unit arranged to gate the blocks of meter readings in the storage unit therethrough, the output of the decoder being connected to the first gate unit so that the block of meter readings corresponding to the count of the counter is gated through the first gate unit;
    a register connected to the output of the first gate unit arranged to store therein the block of meter readings;
    a second gate unit connected to the output of the resister;
    a scanner connected to the second gate unit and operative to enable the second gate unit in a manner such that the contents of the register are gated therethrough on a bit by bit basis in response to a read signal; and
    a decoder having an input connected to the output of the second gate unit and an output connected to the modem.

10. A system according to claim 9, in which each remote terminal further comprises a timer having an input responsive to the read signals and an output connected to the counter, the timer being arranged to reset the contents of the counter to an initial value at a predetermined time after receipt of a read signal.

11. A system according to claim 10, in which the connection unit comprises:
    a switch arranged to complete and break the telephone connection by being closed and opened respectively;
    a bistable device connected to open and close the switch;
    a call signal detector arranged to set the bistable device and thereby cause the switch to complete the telephone connection in response to the call signal; and
    an end signal detector arranged to reset the bistable device and thereby cause the bistable device and switch to break the telephone connection in response to the end signal.

12. A system according to claim 11, in which the connection unit further comprises a timer arranged to reset the bistable device at a predetermined time after receipt of the call signal.

* * * * *